United States Patent
Mickelson et al.

(10) Patent No.: US 6,319,008 B1
(45) Date of Patent: Nov. 20, 2001

(54) AVIONICS SIMULATOR

(75) Inventors: Carl T. Mickelson, Clinton; Scott B. Powell; Chris G. Horattas, both of Stow, all of OH (US)

(73) Assignee: Lockheed-Martin Tactical Defense Systems, Akron, OH (US)

( * ) Notice: Subject to any disclaimer, the term of this patent is extended or adjusted under 35 U.S.C. 154(b) by 1261 days.

(21) Appl. No.: 08/503,625

(22) Filed: Jul. 18, 1995

Related U.S. Application Data

(63) Continuation of application No. 08/020,936, filed on Feb. 22, 1993.

(51) Int. Cl.$^7$ .................................................. G09B 9/08
(52) U.S. Cl. ............................................... 434/29; 434/30
(58) Field of Search .................................. 434/14, 29–31, 434/33–35

(56) References Cited

U.S. PATENT DOCUMENTS

| | | | |
|---|---|---|---|
| 4,463,605 | * | 8/1984 | McDowell et al. ................ 434/31 X |
| 4,718,064 | * | 1/1988 | Edwards et al. ................. 364/321 X |
| 5,023,791 | * | 6/1991 | Herzberg et al. ........... 364/429.03 X |
| 5,260,874 | * | 11/1993 | Berner et al. ..................... 434/35 X |

OTHER PUBLICATIONS

"Special Report : Electronic Warfare," Aviation Week & Space Technology, Feb. 9, 1987, p. 69.*
"Shuttle Simulator Tours Outer Space Without Leaving the Ground," Popular Science, Aug. 1979, p. 60.*
"Shuttle Creates New Astronaut Training Challenges," Aviation Week & Space Technology, Aug. 14, 1978, p. 50.*

* cited by examiner

*Primary Examiner*—John Mulcahy
(74) *Attorney, Agent, or Firm*—Renner, Kenner, Greive, Bobak, Taylor & Weber

(57) ABSTRACT

An avionics simulator is provided in which an operational flight program processor is provided as a functional equivalent to a central processing unit of an avionics system of an aircraft being simulated. Accordingly, the Operational Flight Program may be run in the operational flight program processor in the same manner in which it would be run in the central processing unit of the avionics system of the aircraft itself. Accordingly, identity of operation is attained without the necessity of complex programming and/or interface generation. The remainder of the avionics simulation computer is software or firmware configured to replicate aircraft operation, responses, and data input.

5 Claims, 2 Drawing Sheets

AVIONICS SIMULATOR

This is a continuation of application Ser. No. 08/020,936, filed Feb. 22, 1993.

TECHNICAL FIELD

The invention herein resides in the art of flight simulators of the type typically employed to train pilots and crew members in the function and operation of aircraft. Particularly, the invention relates to systems for simulating avionic device functions in flight simulators. Specifically, the invention relates to a flight simulator system employing a replication of the prime hardware of the associated aircraft for the central processing unit and a software simulation of the remainder of the avionics devices.

BACKGROUND ART

Those skilled in the art readily appreciate that there are typically two approaches taken to implementing avionic functions in a flight simulator environment. Techniques involving total software simulation and others incorporating the prime aircraft hardware have previously been employed.

In the context of a flight simulator, simulation is a process whereby the functionality of an avionics system is modeled in software, which is run on the simulator host computer. Typically, the model is based on design data provided to the simulator designer by the avionics manufacturer. For a full fidelity trainer, the model must implement all functionality of the avionic device and run in real time. All signal and data interfaces of the device must also be simulated. Accordingly, the proper data must be obtained from other system simulations and passed to the software model.

Use of the simulation approach provides significant benefits. The model can include Simulator Specific Functions (SSF's) which are not present in the avionic device. For example, if a "freeze" mode of operation were desired to freeze or maintain a frame of the simulator operation, such can readily be attained by simulation, whereas such a "freeze" mode is impossible to attain in normal operation of the aircraft hardware. Additionally, when using the simulation approach, actual aircraft devices, which are often costly and require special interfacing hardware, are not needed. Portions of the avionic device which operate undetected by the pilot and crew being trained, such as diagnostic testing and the like, can be simplified or not modeled at all in the simulation approach.

While the simulation approach has various benefits as discussed above, over the life cycle of the simulator or trainer, the simulation approach has been noted to exhibit serious deficiencies. The most compelling deficiency is the issue of maintaining the simulation concurrent with the aircraft avionic device as it is upgraded with new software revisions. Generally, accurate design data is not available to the simulator designer until the same time frame in which the software update is fielded to the aircraft. During the time that the simulator model update is being designed, implemented, verified for fidelity, and fielded, the crew members are receiving negative training on an outdated simulator. In other words, a significant lag time results between the updating of the flight simulator with respect to updates already employed in the actual aircraft hardware.

The prime hardware incorporation approach to flight simulator development attempts to address the concurrency problem which is significant in the simulation approach. By integrating the actual avionic device into the trainer and loading the actual Operational Flight Program (OFP) into it, operational fidelity can be maintained by installing new software on the simulator at the same time it is fielded to the aircraft. However, new difficulties are introduced when the prime hardware incorporation approach is employed. The device is often costly and in short supply, especially during the early phases of an aircraft development or update. All signal interfaces of the device must be met, which often introduces a need for custom designed interface hardware such as special serial buses and the like.

Additionally, it has been noted that avionic devices designed for two or four hour flight missions often exhibit reduced reliability during eighteen or twenty-four hour training schedules. In other words, the work load placed upon the hardware in the environment of a flight simulator is generally greater than that placed upon it in actual flight operations, for flight operations often occur in short time spans over long periods of time, whereas a flight simulator is often employed for extended durations approaching full time operation.

Most significantly with respect to the prime hardware incorporation approach is the fact that implementation of SSF's requires modifications to the OFP, which can create logistical difficulties since the avionics OFP and simulator are seldom written and maintained by the same contractor. A very awkward interaction must be supported whereby the avionics integrator must implement functions which it does not understand, which may add great complexity to its task, and for which it has no good test methodology. Typically, avionics designers are extremely hesitant to implement such functions.

DISCLOSURE OF INVENTION

In light of the foregoing, it is a first aspect of the invention to provide an avionics simulator which combines instruction set architecture compatible prime hardware incorporation and the simulation approach to simulator design.

Another aspect of the invention is the provision of an avionics simulator which employs central processing unit hardware to execute the Operational Flight Program.

Still a further aspect of the invention is the provision of an avionics simulator which employs software to replicate portions of the avionics device other than the central processing unit.

Further aspects of the invention are to provide an avionics simulator which is more durable and reliable for training purposes than systems employing solely the prime hardware concept.

Yet a further aspect of the invention is the provision of an avionics simulator which may be readily constructed and implemented with state of the art techniques and commercially available components.

The foregoing and other aspects of the invention which will become apparent as the detailed description proceeds are achieved by: an avionics simulator for training in the use and operation of an aircraft, comprising: an operational flight program processor; a control central processing unit; a programmable input/output emulator; and a bus interconnecting said operational flight program processor, control central processing unit, and programmable input/output emulator.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
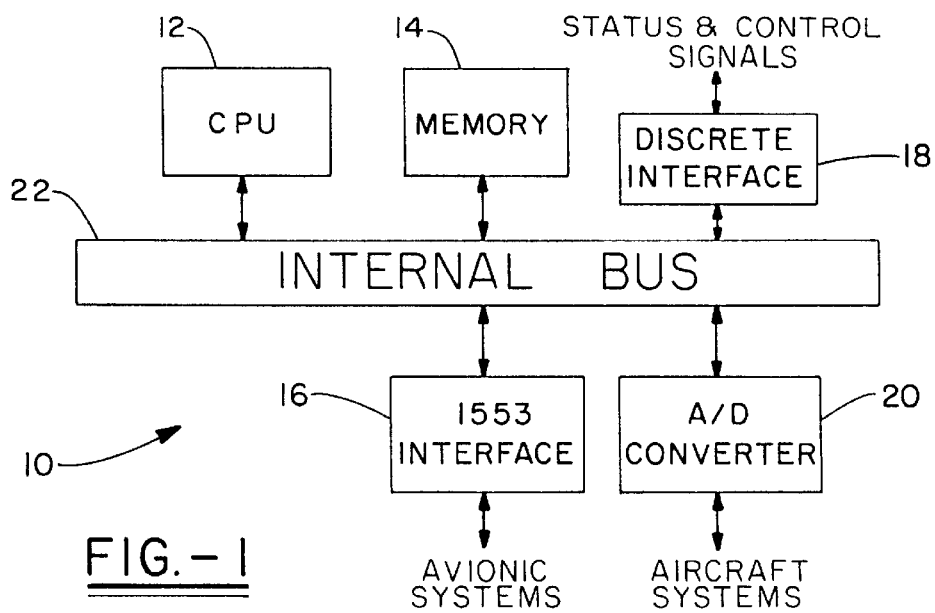
FIG. 1 is an illustration of an actual aircraft avionics system.

Referring now to the drawings and more particularly FIG. 1, it can be seen that an actual aircraft avionics system is designated generally by the numeral 10. As shown, the typical avionics system includes a central processing unit (CPU) 12, appropriate memory devices 14, and a plurality of interfaces to external systems or signals such as an interface 16 to avionics systems, a discrete interface 18 to receive various status and control signals, and an analog-to-digital converter 20 serving as an interface to the aircraft systems. The components 12–20 communicate with each other through an appropriate internal bus 22. It can be appreciated from the illustration of FIG. 1 that conventional avionic devices consist of three types of components: (1) central processing units (CPU's), (2) memory devices, and (3) interfaces to external systems or signals. While the CPU's typically run operational flight software, which is subject to frequent updates, the remainder of the device is typically hardware or firmware controlled and changes only with major aircraft upgrades. The approach of the instant Avionics Simulation Computer (ASC), applies the prime hardware incorporation philosophy to the CPU's, and the simulation approach to the remainder of the device. Accordingly, the concept of the instant invention presented herein is a hybrid of the two previously known approaches to implementing avionic functions in flight simulator environments.

Figure 2:
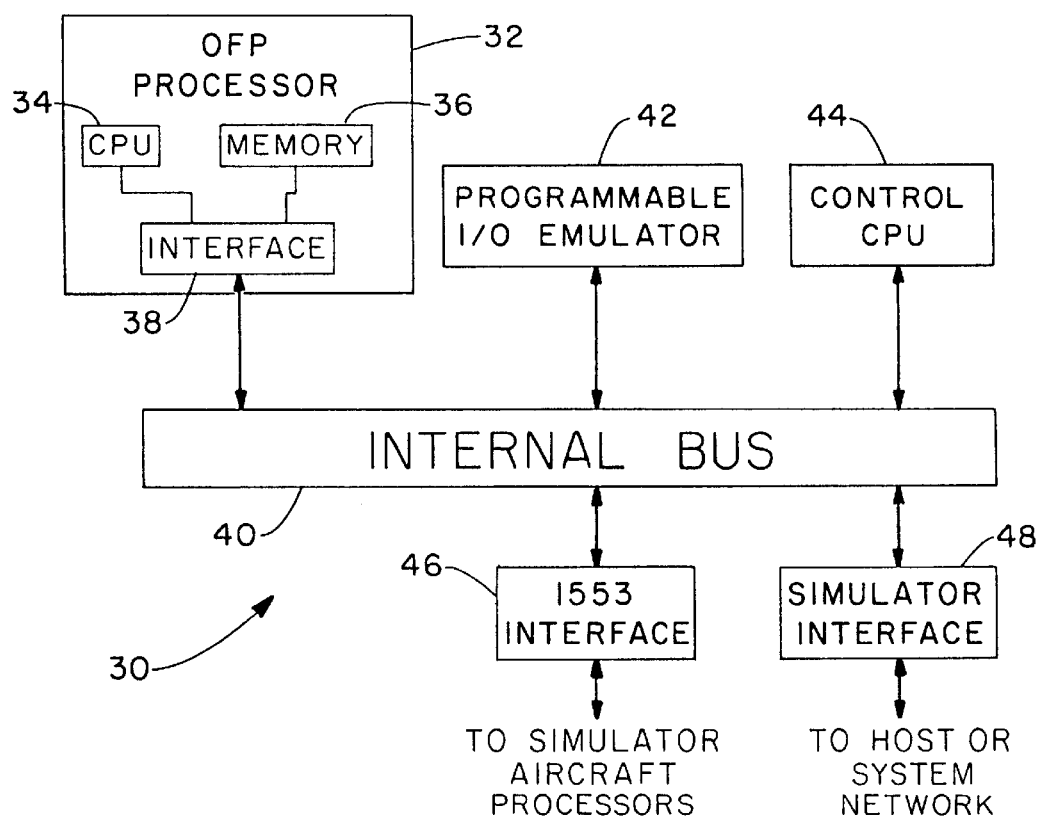
FIG. 2 is a structural block diagram of the avionics simulation computer according to the invention.

With reference now to FIG. 2, an appreciation of the structure of the invention can be obtained. Here, the Avionics Simulation Computer (ASC) of the invention is designated generally by the numeral 30. The concept of the ASC 30 is to provide a CPU that will support the execution of the Operational Flight Program (OFP) on a machine instruction basis, with all the features of the CPU of the avionic device, including special purpose registers, timers, and the like. To this end, an operational flight program processor 32 is provided with a CPU 34, memory 36, and interface 38. The operation of all other components of the avionic device is simulated by vectoring input/output commands and data across an ASC internal bus 40, where they are detected and stored by a programmable input/output emulator 42. A control CPU 44 is provided to receive the input/output messages and, communicating with aircraft simulation routines if necessary, to emulate the proper responses to the OFP processor 32. All data structures and timing requirements of the avionic device are met, and the Operational Flight Program sees no difference in operation in the simulator.

Also included as a portion of the ASC 30, if required for the simulator application, is an interface 46, interconnecting the internal bus 40 with simulator aircraft processors, and a simulator interface 48 interconnecting the internal bus with the host computer or system network.

The OFP processor 32 is the only hardware portion of the ASC 30 which may be unique to the avionic device being simulated. Since it must support the entire Instruction Set Architecture (ISA) of the avionic device, if that device contains an especially developed processor, then a unique OFP processor 32 will need to be developed. However, there is presently a movement toward standardized computer architectures and ISA's in the avionics industry and in many cases a CPU which is designed to a Military Standard ISA can support the emulation of multiple devices. In some cases, the CPU 34 is available commercially off-the-shelf.

Since commercial grade hardware is sufficient for simulator environments, it has been found to be possible to obtain an OFP processor 32 which runs at a higher speed than the militarized equivalent. This fact may result in the generation of spare processing time in each OFP frame to allow performance of Simulator Specific Functions (SSF's) without modification to the Operational Flight Program. The SSF's are implemented by overwriting OFP data values to implement parameter freezes and resets and extracting data to evaluate performance. This data access is performed by the control CPU 44, via the internal bus 40, into the dual-port memory 36 of the OFP processor 32 during the spare time at the end of each frame.

While the OFP processor 32 is configured of hardware substantially identical to that of the avionics system to be simulated, the remainder of the ASC 30 is entirely software programmable to support the emulation of any device. The operation of the ASC 30 may be appreciated from reference to the illustration of FIG. 3 presented below.

To avoid a waste of processing time in the CPU while waiting for input/output interfaces to return data, the normal method of communication with such interfaces is to build a table of commands and data buffers within CPU memory, issue a "start" command to the interface, and continue on with other tasks. The interface then accesses these tables via a Direct Memory Access (DMA) process, performs its commanded communication, and returns any data or status information to CPU memory, also by means of DMA. It may activate an interrupt to notify the CPU of its completion. The CPU then checks the status message and processes the returned data. In the ASC 30, the control CPU 44 emulates the operations of all the external interfaces. Reading from the programmable input/output emulator 42 what commands have been issued by the OFP, it reads command and data tables from the memory 36 of the OFP processor 32. Determining what aircraft system or signal the OFP desires communication with, it obtains the data required to formulate a response. The control CPU 44 stages the responses that the OFP would see in the aircraft into the memory 36 of the OFP processor 32, and activates the "completion" interrupt. The OFP can continue to execute normally.

Figure 3:
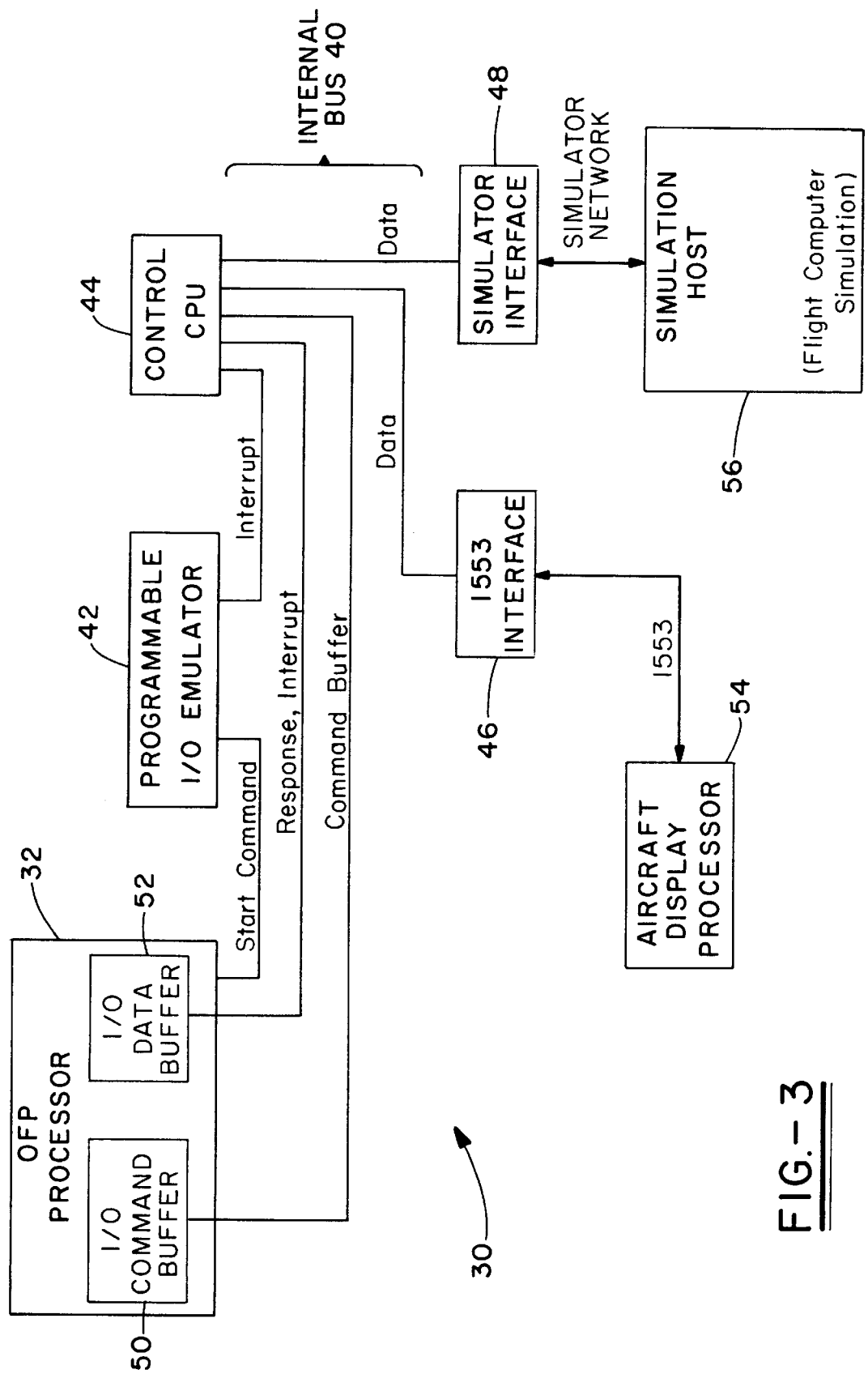
FIG. 3 is a functional block diagram of the avionics simulation computer of the invention.

As an example of the operation of the ASC 30, reference should now be made to FIG. 3. Here, the OFP issues a start command after building a command table listing messages to be requested from two avionics subsystems. The start command is passed from the OFP processor 32 to the programmable input/output emulator 42, which interrupts the control CPU 44. The control CPU 44 reads the command and, emulating the firmware of the interface 16, reads the command tables from the memory 36 of the OFP processor 32 over the internal bus 40.

By way of example, assume that the first device or subsystem is a flight computer, which is simulated by one of the host computers 56. The control CPU 44, via a host interface 48, obtains from that simulation parameters that would be part of the required message. These are formatted into the words that would be received over the data bus, and stored back into the OFP processor memory 36. A status word is added to the input/output command buffer 50 by the control CPU 44, indicating a successful transfer, again as an emulation of the operation of the aircraft interface.

The second device may be a display processor 54, which is actually present in the trainer system. In this case, the control CPU 44 actually initiates the required messages via the interface 46. The returned data, again with an added status word, is staged into the memory 36 of the OFP processor 32. At this point, the control CPU 44 activates an interrupt to the OFP processor 32. When the interrupt is serviced, the OFP processor 32 sees the same data buffer which it would have seen if it were running in the aircraft environment.

There are some special cases where the Operational Flight Program requires immediate response from an external interface, and does not use the DMA mechanism. In these cases, the programmable input/output emulator 42 has the ability to suspend the OFP processor 32, if the control CPU 44 requires extra time to formulate a response. The programmable I/O emulator 42 can also be preloaded with responses to be immediately returned to the OFP Processor 32 in response to this type of command, if such response can be formulated in advance of the command. There are typically not a large number of these types of accesses, and any extra time needed to satisfy them fits well within the extra time created for SSF's.

It should here be noted that the software in the control CPU 44 that performs the input/output emulations models the characteristics of the hardware and firmware in the avionic device's interfaces. It provides all interface capability, not just that being utilized in the "current" version of the OFP. In this way, it should not require updating unless the avionic device undergoes a hardware modification.

It should now be appreciated that the ASC 30 is a powerful tool for implementing avionic functions in a trainer environment. It requires no costly, long lead, difficult to maintain aircraft hardware. Its software does not require updating when new flight software is introduced. Since it is software reconfigurable, a single hardware device can be used in different trainers, or in a reconfigurable trainer. Since it has the ability to override OFP parameters on its own, no special changes are required in flight software to accommodate trainer functions.

Following the concept of the instant invention, the ASC 30 may simulate avionic devices of any of a variety of different aircraft. It may contain several different types of OFP processors 32 to emulate each device, with only one being active for the particular device being emulated. While the traditional approach of such simulation would have required that each trainer feature a set of aircraft avionic hardware for each simulated aircraft, the flexibility and adaptability of the concept of the instant invention should now be apparent.

It will further be apparent to those skilled in the art that the ASC 30 may also be used to emulate control and display processors. A commercial graphics engine may be employed to interface to the ASC 30 to simulate the display generation portion of the device.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. An avionics simulator for training in the use and operation of an aircraft, comprising:

an operational flight program processor for executing an Operational Flight Program of a specific avionic device on a machine instruction basis and configured of hardware substantially identical to that of said specific avionic device;

a control central processing unit;

a programmable input/output emulator;

a bus interconnecting said operational flight program processor, control central processing unit, and programmable input/output emulator, wherein said operational flight program processor issues commands to said programmable input/output emulator, which commands are read by said control central processing unit which formulates responses to such commands, which responses are passed across said bus to said operational flight program processor; and wherein said control central processing. unit said programmable input/output emulator do not duplicate hardware of the aircraft, but are software programmable to emulate avionics devices of the aircraft.

2. The avionics simulator according to claim 1, wherein said control central processing unit receives input/output messages from said programmable input/output emulator and emulates responses to said central processing unit of said operational flight processor.

3. The avionics simulator according to claim 2, further comprising an interface between said bus and simulator aircraft processors.

4. The avionics simulator according to claim 3, further comprising a host computer and a simulator interface between said bus and said host computer.

5. The avionics simulator according to claim 4, wherein said control central processing unit emulates communication with avionics subsystems connected to said interfaces.

\* \* \* \* \*